United States Patent
Lirov et al.

(10) Patent No.: US 6,785,810 B1
(45) Date of Patent: Aug. 31, 2004

(54) SYSTEM AND METHOD FOR PROVIDING SECURE TRANSMISSION, SEARCH, AND STORAGE OF DATA

(75) Inventors: Yuval Lirov, Morganville, NJ (US); Erez Lirov, Morganville, NJ (US)

(73) Assignee: eSpoc, Inc., Morganville, NJ (US)

( * ) Notice: Subject to any disclaimer, the term of this patent is extended or adjusted under 35 U.S.C. 154(b) by 0 days.

(21) Appl. No.: 09/388,025

(22) Filed: Aug. 31, 1999

(51) Int. Cl.[7] .............................. H04L 9/00; H04L 9/32; G06F 11/30; G06F 12/14; G06F 17/30; G06F 7/06
(52) U.S. Cl. ........................... 713/165; 713/193; 707/9
(58) Field of Search .............................. 713/165, 193; 707/9

(56) References Cited

U.S. PATENT DOCUMENTS

| | | | |
|---|---|---|---|
| 4,531,527 A | | 7/1985 | Reinhold, Jr. et al. |
| 4,588,991 A | * | 5/1986 | Atalla .................... 713/165 |
| 4,712,562 A | | 12/1987 | Ohayon et al. |
| 4,838,275 A | | 6/1989 | Lee |
| 5,012,411 A | | 4/1991 | Policastro et al. |
| 5,313,521 A | * | 5/1994 | Torii et al. .................. 380/281 |
| 5,418,951 A | | 5/1995 | Damashek |
| 5,553,146 A | * | 9/1996 | Flake ........................ 713/150 |
| 5,606,315 A | * | 2/1997 | Gaskins .................... 340/5.74 |
| 5,706,365 A | | 1/1998 | Rangarajan et al. |
| 5,772,585 A | | 6/1998 | Lavin et al. |
| 5,832,450 A | | 11/1998 | Myers et al. |
| 5,845,255 A | | 12/1998 | Mayaud |
| 5,862,223 A | | 1/1999 | Walker et al. |
| 5,864,683 A | | 1/1999 | Boebert et al. |
| 5,868,669 A | | 2/1999 | Iliff |
| 5,903,721 A | | 5/1999 | Sixtus |
| 5,903,889 A | | 5/1999 | de la Huerga et al. |
| 5,940,507 A | * | 8/1999 | Cane et al. .................. 713/165 |
| 6,092,202 A | * | 7/2000 | Veil et al. .................... 713/201 |
| 6,230,272 B1 | * | 5/2001 | Lockhart et al. ............ 713/202 |

* cited by examiner

*Primary Examiner*—Gilberto Barron
*Assistant Examiner*—Benjamin E. Lanier
(74) *Attorney, Agent, or Firm*—Kenyon & Kenyon

(57) ABSTRACT

A system and method for securely transmitting, searching, and storing data. To ensure security on the client side of a communication network, the system and method double encrypt sensitive data and single encrypt non-sensitive data. The system and method also fuzzy searches for user information. Thus, it is possible to find the information for the user in a database knowing only a minimal amount of detail about that user. Privacy and security is provided without impeding performance or compromising any of the standard database search functionality. Capitalizing on the difference in privacy requirements between users, the number of keys required to access sensitive data is minimized by using a single key for each user (e.g., a patient) and two keys for other users (e.g., health care providers).

10 Claims, 15 Drawing Sheets

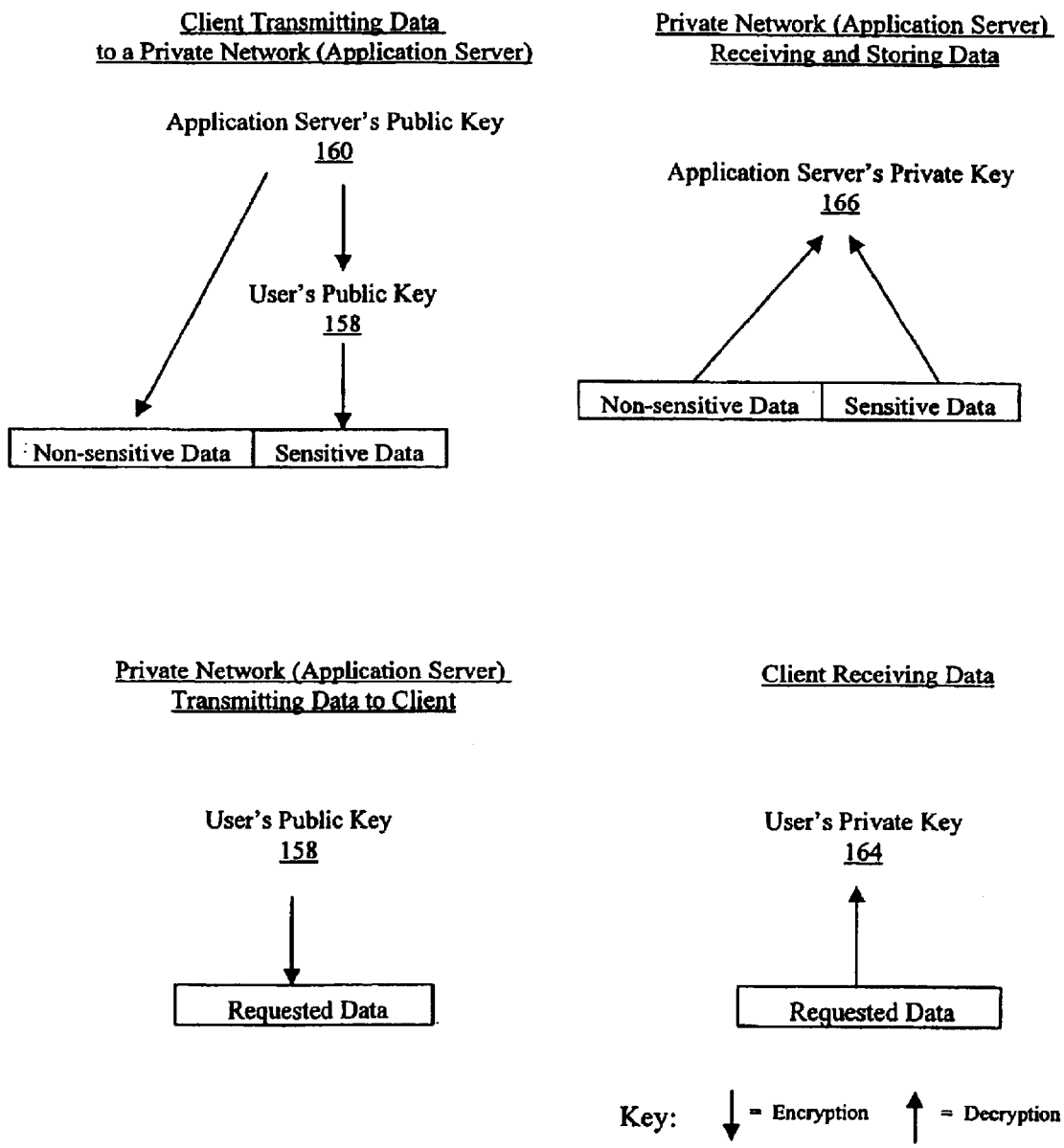

Keys Utilized in Fuzzy Searching

Key: ↓ = Encryption  ↑ = Decryption

Keys Utilized in Relational Database Searching

Fig. 1f
Keys Utilized in Accessing Sensitive Data
First User's Key-Store Master Key
168
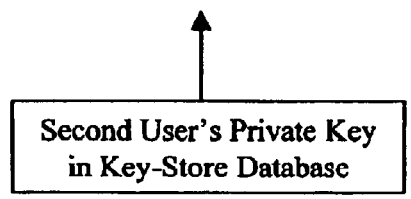
Second User's Private Key
in Key-Store Database
Second User's Private Key
164
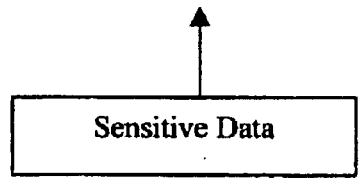
Sensitive Data
Key: ↓ = Encryption  ↑ = Decryption Steps for Communications between a Client and a Private Network

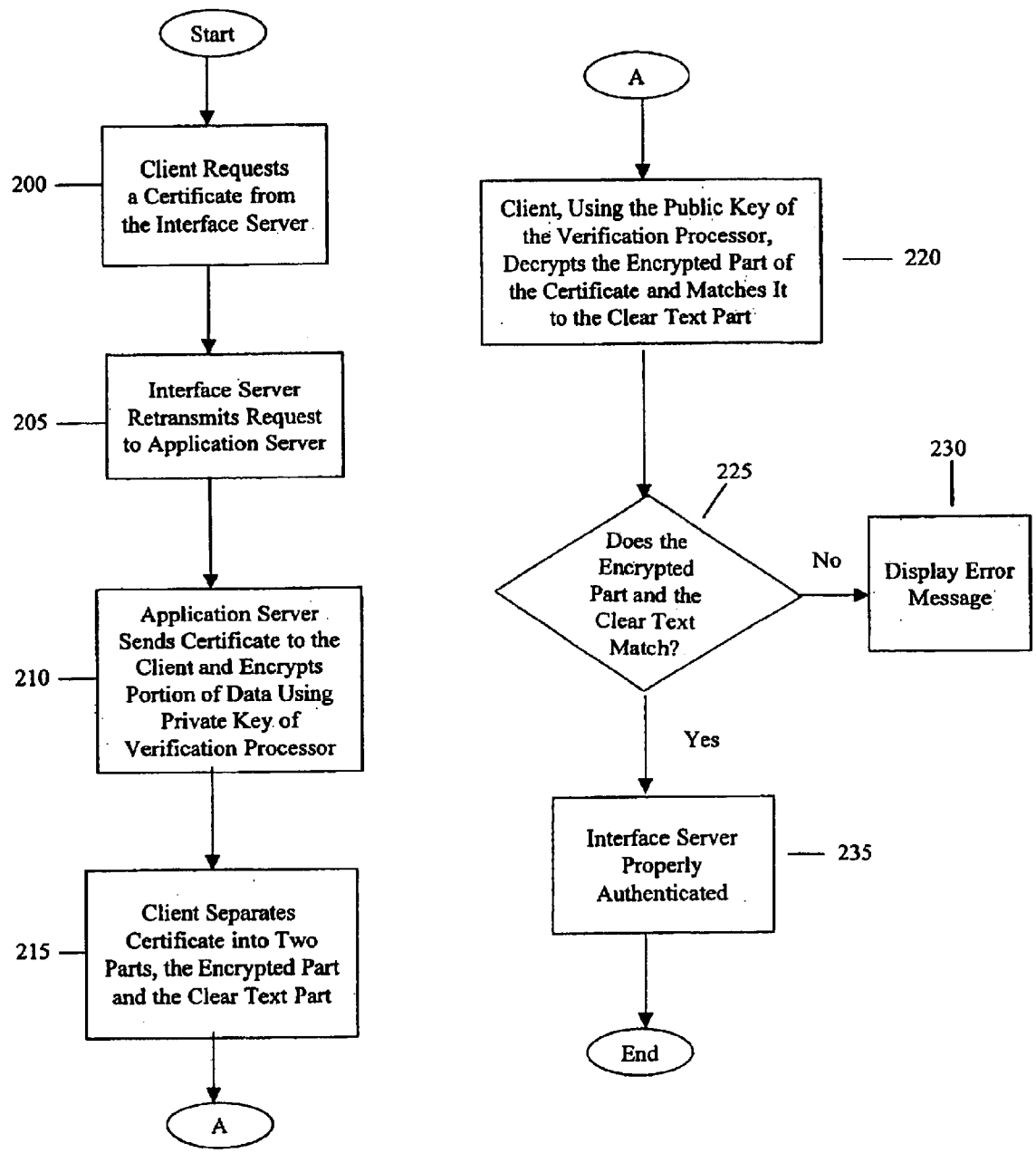

Search Operation

Search Operation

Accessing Sensitive Data

Accessing Sensitive Data (Cont.)

US 6,785,810 B1

SYSTEM AND METHOD FOR PROVIDING SECURE TRANSMISSION, SEARCH, AND STORAGE OF DATA

FIELD OF THE INVENTION

The present invention relates to computer and network security, and more particularly, a system and method for securely transmitting, searching, and storing data.

BACKGROUND INFORMATION

Advances in computer and communications technology have increased a free flow of information within networked computer systems. While a boon to many, such free flow of information can be disastrous to those systems which process sensitive data. In a typical networked computer system, one or more clients are connected over a communication network to a server.

The risk of a security breach is compounded when a pathway is provided from a private network to a public network such as the Internet. The Internet is a loose conglomeration of networks connected to a standard network protocol. One of the benefits of accessing the Internet is that the vast amounts of information can be accessed by the user. However, of such unobstructed access, the danger is that there are little or virtually no controls on what individuals can access and what they may do with such access. When data is stored or transmitted which allows parties, to access such data even though they are not authorized to access it, it is necessary to take steps to insure the security of that stored data and to ensure the integrity of data transmitted from one computer to another (e.g., via the Internet).

A number of measures, e.g. encryption procedures, have been used to reduce the vulnerability of the networked systems to unauthorized access. Conventional encryption procedures encode data to prevent the unauthorized access, especially during the transmission of the data. Encryption procedure is generally based on one or more keys, or codes, which are essential for decoding, or reverting the data into a readable form.

The traditional encryption techniques focus on the security of the transmission and ignore the security of storage. These techniques provide a protection against the first kind of attacks which include intercepting the data as it is being transmitted. The encryption techniques not only allow the authentication of the sender of a message, but also serve to verify the integrity of the message itself, thus proving that the message has not been altered during the transmission. Such techniques include the use of both symmetric and asymmetric keys, as well as digital signatures and hash algorithms.

The encryption algorithms or procedures are generally characterized in two categories: symmetric and asymmetric. Symmetric algorithms use one key to encrypt and decrypt a message. An encryption key is a sequence of bits that can be used to encode or decode a message. These symmetric algorithms require that both the sender and the intended receiver of the message (and no one else) know the same key. On the other hand, asymmetric algorithms use two separate keys e.g., a public and a private key to encrypt and/or decrypt a message. The public keys are published, (i.e., in the sense that the public key is available from a particular service; such as a telephone directory) so that everyone knows everyone else's public key. The private keys, on the other hand, are kept secret by the owner.

Thus, in a situation where, for example, a patient wanted to send an encrypted message to his or her doctor, the patient would use the doctor's public key to encrypt the message, and then send the encrypted message to the doctor. The doctor would then use his private key to decrypt the message.

The practice of using encryption protocols or procedures to authenticate message senders as well as the integrity of messages is well known in the art (see e.g., Bruce Schneier, Applied Cryptography, Protocols, Algorithms, And Source Code In C, 2d ed., John Wiley & Sons, Inc., 1996).

Conventional systems and methods suffer from, e.g., at least four deficiencies:

1. Restricted media and time: data management security measures only apply to data transmission, thus exposing stored data to an unauthorized access or unauthorized data manipulation;
2. Exceeded user generality: data management security measures ignore interaction patterns between individuals or user groups;
3. Exceeded application scope: security measures ignore specific requirements of particular applications (e.g., medical use); and
4. Exceeded implementation demands: security measures require n−1 keys for a group of n people. (as discussed in the publication by Schneier listed above).

Accordingly, there is a need for a system and method which elevates the security standards across all digital media and prevents compromising data (e.g., patient data) in case of an authorized access of the server. Moreover, there is a need for a system and method that combines security and privacy protection without impeding data processing performance or conventional query scope in a relational database.

SUMMARY OF THE INVENTION

The present invention is directed to a method and system that satisfies the need of securely transmitting, searching, and storing data. Such a system and method allows a user to transfer data securely to a private network by pre-encrypting sensitive data with an encryption key, encrypting both non-sensitive data and the pre-encrypted data with a different encryption key and sending this encrypted data to a private network.

In an embodiment of the system and method, a server is configured to perform fuzzy searching. The procedure for fuzzy searching include creating trigrams for each record in a record database, sorting the trigrams alphabetically, computing signature vectors for each record in the record database, encrypting the signature vectors with an encryption key, and storing the encrypted signature vectors in an encrypted signature database. In addition, the above steps are performed to obtain an encrypted signature vector for a search query. Thereafter, the closest encrypted signature vector is obtained from an encrypted vector database (i.e., the encrypted signature vector that is closest to the search query encrypted signature vector is obtained).

According to another embodiment of the present invention, the record database which contains both non-sensitive data and encrypted sensitive data is searched. This is accomplished by encrypting the search query with an encryption key. Then, one or more records satisfying the search query are found.

Another embodiment of the present invention allows authorized users access to the encrypted sensitive data. First, the database which contains information is checked to determine which users are authorized to access certain data, and if the user is authorized to access such data, then the user is allowed to access a master encryption key. With the master encryption key, a further encryption key is decrypted. This further encryption key provides access for the user to the sensitive data.

BRIEF DESCRIPTION OF THE DRAWINGS

FIG. 1b shows exemplary keys utilized for authenticating the interface server in the system illustrated in FIG. 1a.

FIG. 1c shows exemplary keys utilized for transmitting, receiving, and storing data in the system illustrated in FIG. 1a.

FIG. 1d shows exemplary keys utilized for fuzzy searching a database in the system illustrated in FIG. 1a.

FIG. 1e shows exemplary keys utilized for relational database searching in the system illustrated in FIG. 1a.

FIG. 1f shows exemplary keys utilized for accessing sensitive data in the system illustrated in FIG. 1a.

FIG. 2 shows another exemplary embodiment of a method according to the present invention for authenticating an interface server.

DETAILED DESCRIPTION

Overview

Figure 1A:
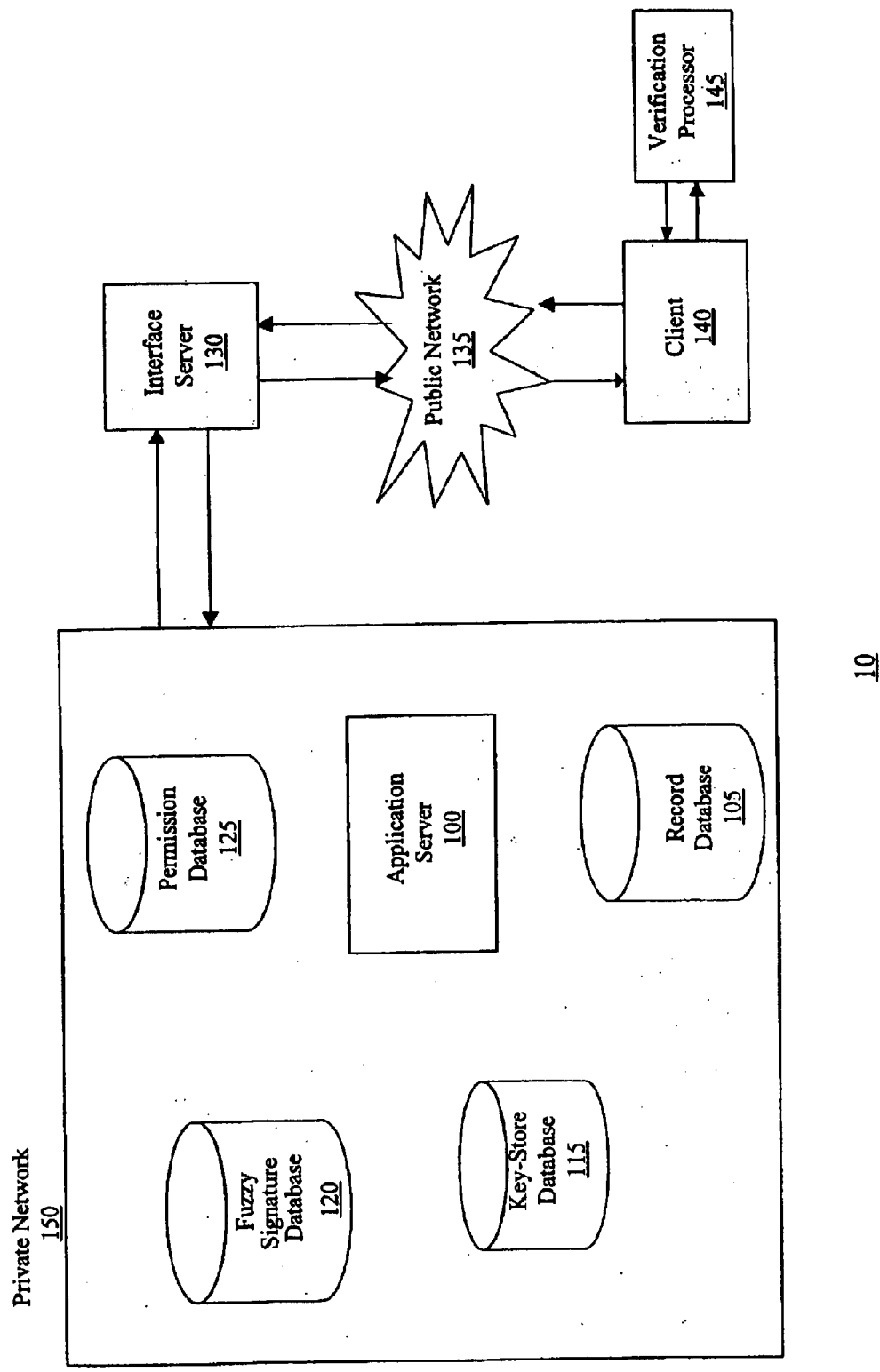
FIG. 1a shows an exemplary embodiment of a system according to the present invention.

The system and method according to the present invention addresses the problems of conventional systems and methods as discussed above by, e.g.: (1) securely transferring and storing sensitive data in a performance enhancing manner by double encrypting preferably only the sensitive data; (2) performing fuzzy searching to allow access to user information knowing a limited amount of information about the user; (3) performing relational database operations on a database that contains unencrypted non-sensitive information and, possibly, encrypted sensitive information; and (4) allowing authorized users access to the sensitive information using a minimum number of keys.

To reduce a performance overhead associated with an information protection process, only a subset of the stored data may be protected (e.g. only a subset of the stored data may be encrypted). Initially, the data is segmented into two basic data types using the sensitivity criteria. For example, in the healthcare industry, the time of the day in which a procedure is scheduled is not sensitive information. Every patient ultimately needs to know when a particular doctor is available, and so, this information should be readily available. However, the name of the patient involved is sensitive information which should be protected.

The system and method is suitable in a situation where there are two interacting groups of users and two classes of records. The two interacting groups of users are a privileged user group and a non-privileged user group. A user can be generally defined as either a privileged user or a non-privileged user. For example, in the healthcare industry, the two interacting groups of users would be the patients (e.g. the non-privileged user group), and the healthcare providers such as doctors (e.g. the privileged user group). The two classes of records would be, e.g.: (1) patient records (e.g., non-privileged user records) and (2) the doctor records (e.g., privileged user records).

For example, the patients grant access privileges (to their records) to some doctors and deny access to all other patients and doctors. The doctors to which privileges were granted, in consultation and agreement with their patients, grant access privileges (to some of those patient records) to some doctors. The doctors also grant access privileges to their research to some other doctors and to some patients (see Table 1 below for a listing of the exemplary privileges which may be granted). The system and method according to the present invention utilizes the asymmetry of the privilege granting scheme to minimize the number of keys used by the participating users.

TABLE 1

Access Privilege Asymmetry

|  | Patient records | Doctor research records |
|---|---|---|
| Patient grants access | To some doctors | No |
| Doctor grants access | To some doctors and some patients | To some doctors and some patients |

Thus, an asymmetric key protocol is used for allowing a transmission of a client's request to a private network. Data is encrypted or decrypted using a public or private key. Algorithms for encrypting and decrypting data are known in the art and include Rivest-Shamir-Adleman encryption ("RSA") and Directory System Agent encryption ("DSA").

FIG. 1a shows an exemplary embodiment of the system 10 according to the present invention. An asymmetric key protocol is used for security purposes. A private network (arrangement) 150 includes, e.g., an application server 100, a record database 105, a key-store database 115, a fuzzy signature database 120, and a permission database 125.

A public network 135 can be a network in which all users have access without the need for bypassing security measures. An example of the public network 135 is the Internet. An interface server 130 is coupled between the private network 150 and the public network 135 thus allowing users (e.g., physicians and patients) access to information on the private network 150. A client 140 may include all of the users who require access to information from the private network 150. When the present invention is used in the medical setting, the client 140 may be a physician or a patient. A verification processor 145 performs a verification function by comparing the two parts of a certificate transmitted by the application server 100 to determine if these two parts match and if so, the interface server 130 is authenticated. The verification processor 145 can be implemented using either hardware or software.

The application server 100 controls the access and retrieval of data between the various databases. The record database 105 is a database containing information such as, e.g., patient records (e.g., patient's name, patient's appointments, disease history, disease diagnosis, etc.) and doctor records (e.g., doctor's research on various diseases).

Some of this information, such as the patient's name and disease history, is sensitive information and thus is encrypted using the patient's public key.

The key-store database 115 is a database containing the users' private keys which are encrypted using a key-store master symmetric key. The fuzzy signature database 120 is a database containing signature vectors for each of the users in the record database 105, with each signature vector being encrypted using the user's public key. The permission database 125 is a database containing information regarding whether a specific user (such as a doctor or patient) has access to a specific file or record.

The system and method according to the present invention uses an encryption procedure, e.g., at five phases:

1. Selected sensitive information is encrypted at the source level. This information remains encrypted during storage.
2. All data that is to be transmitted is encrypted is encrypted using a key.
3. Private keys are encrypted and stored in the key-store database 115. All doctors may share a single key to decrypt keys in the key-store database 115.
4. Sensitive query conditions are encrypted to enable standard SQL searching while preventing retrieval of similar but irrelevant sensitive data.
5. Fuzzy signature vectors for every user record in the record database 105 is encrypted with the user's public key. Such encryption allows fuzzy search for data including specific sub-strings by encrypting the sub-strings with the user's public key and searching the fuzzy signature database 120.

FIGS. 1b to 1f shows exemplary keys which can be used for encrypting and decrypting data. In this exemplary embodiment, an asymmetric encryption algorithm may be employed using both public and private keys. Once data is encrypted using a public key, it can only be decrypted using the corresponding private key. Alternatively, if data is encrypted using a private key, it can only be decrypted using the corresponding public key. The public keys can be obtained by anyone from, for example, a service similar to a telephone directory. The private keys, however, are kept secret.

Figure 1B:
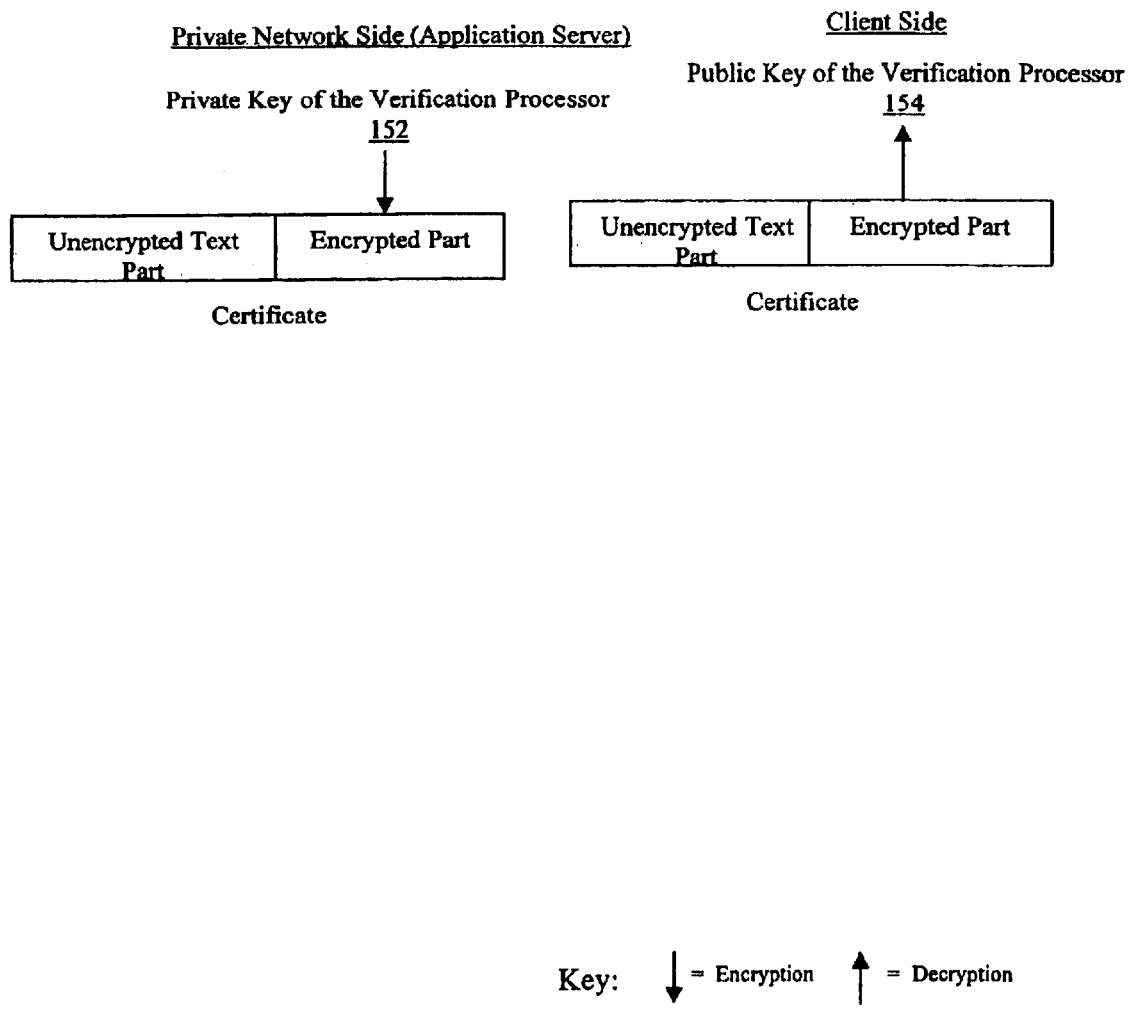

FIG. 1b shows the keys which may be used to authenticate the interface server 130. The application server 100 sends a certificate to the client 140. The certificate contains both an unencrypted text part and an encrypted part. The encrypted part of the certificate is encrypted using the private key of the verification processor 152. Once the certificate is received by the client 140, the encrypted part of the certificate is decrypted using a public key of the verification processor 154.

FIG. 1c shows the keys which may be used in transmitting, receiving, and storing data. For example, when the client 140 transmits data to the application server 100 in the private network 150, the client 140 pre-encrypts sensitive data using the user's public key 158 (i.e., the user whose information is to be found from the record database 105). Then the client 140 encrypts both non-sensitive data and the sensitive data using an application server's public key 160. After the application server 100 (in the private network 150) receives the encrypted data from the client 140, the application server 100 decrypts both the sensitive data and the non-sensitive data using an application server's private key 161. However, the sensitive data remains secure because that data is only accessible when it is again decrypted using a user's private key 164.

When the application server 100 transmits data to the client 140, it uses the user's public key 158 to encrypt the requested data. The user's public key 158, as defined herein, is the public key of the user, for example in the case of a database search, whose data is to be retrieved from the record database 105. When the client 140 receives the encrypted data from the application server 100, it decrypts that data using the user's private key 164. The user's private key 164, as defined herein, is the private key of the user, for example in the case of a database search, whose data is to be retrieved from the record database 105.

Figure 1D:
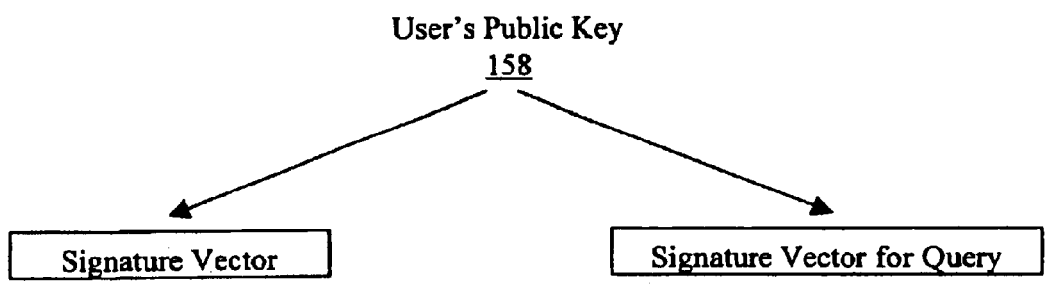

FIG. 1d shows the key which may be used in a fuzzy search. The application server 100 encrypts all signature vectors corresponding to all records in the record database 105 using the user's public key 158. In addition, the application server 100 encrypts the signature vector for a particular search query using the user's public key 158.

Figure 1E:
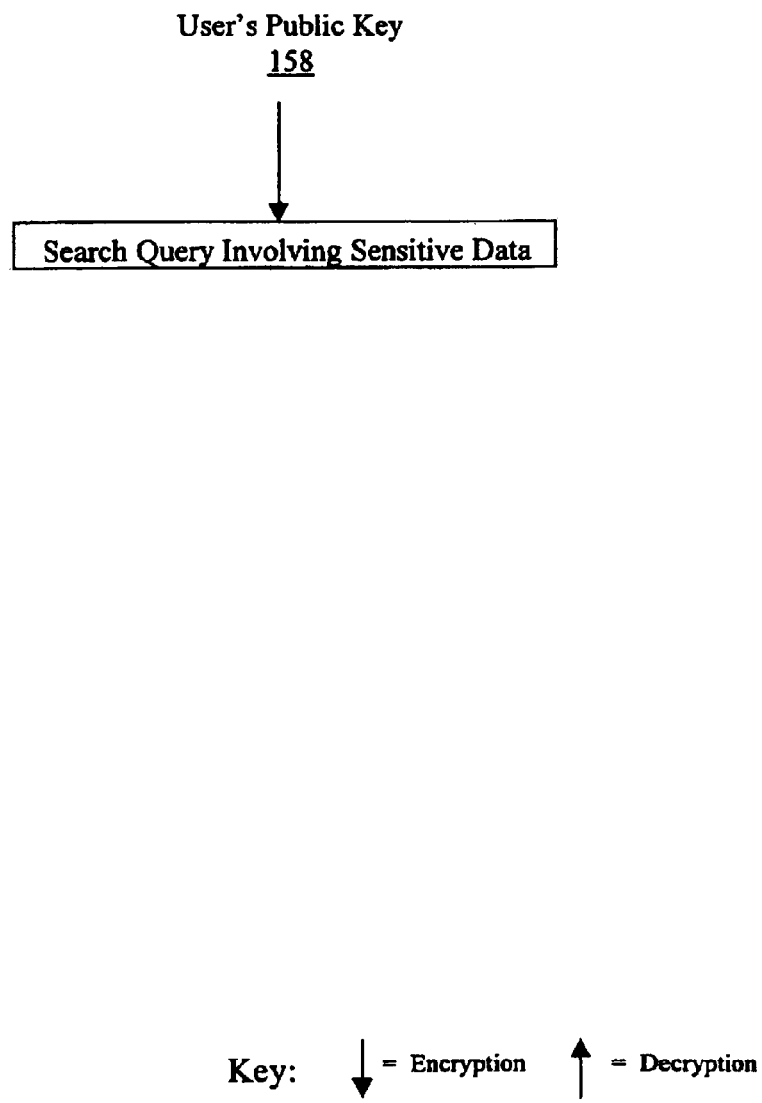

FIG. 1e shows the key which may be used in a relational database search. If the search query relates to or utilizes sensitive data, then the application server 100 encrypts the search query using the user's (e.g. patient's) public key 158. Because sensitive information is encrypted in the database which is to be searched, the encryption of the search query allows standard relational database operations to be performed on encrypted data in such a database. Standard relational database operations include searching using, e.g., the SELECT and IF-THEN command.

FIG. 1f shows the keys which may be used for accessing sensitive data. The application server 100 uses first user's (e.g., doctor's) key-store master key 168 to decrypt the second user's (e.g., patient's) private key 164 (which is stored as an encrypted key in the key-store database 115). The application server 100 accesses the sensitive data in the record database 105 by decrypting the sensitive data using the second user's private key 164. The user's private key 164, as defined above, is the private key of the user, for example in the case of a database search, whose data is to be retrieved from the record database 105.

Figure 1H:
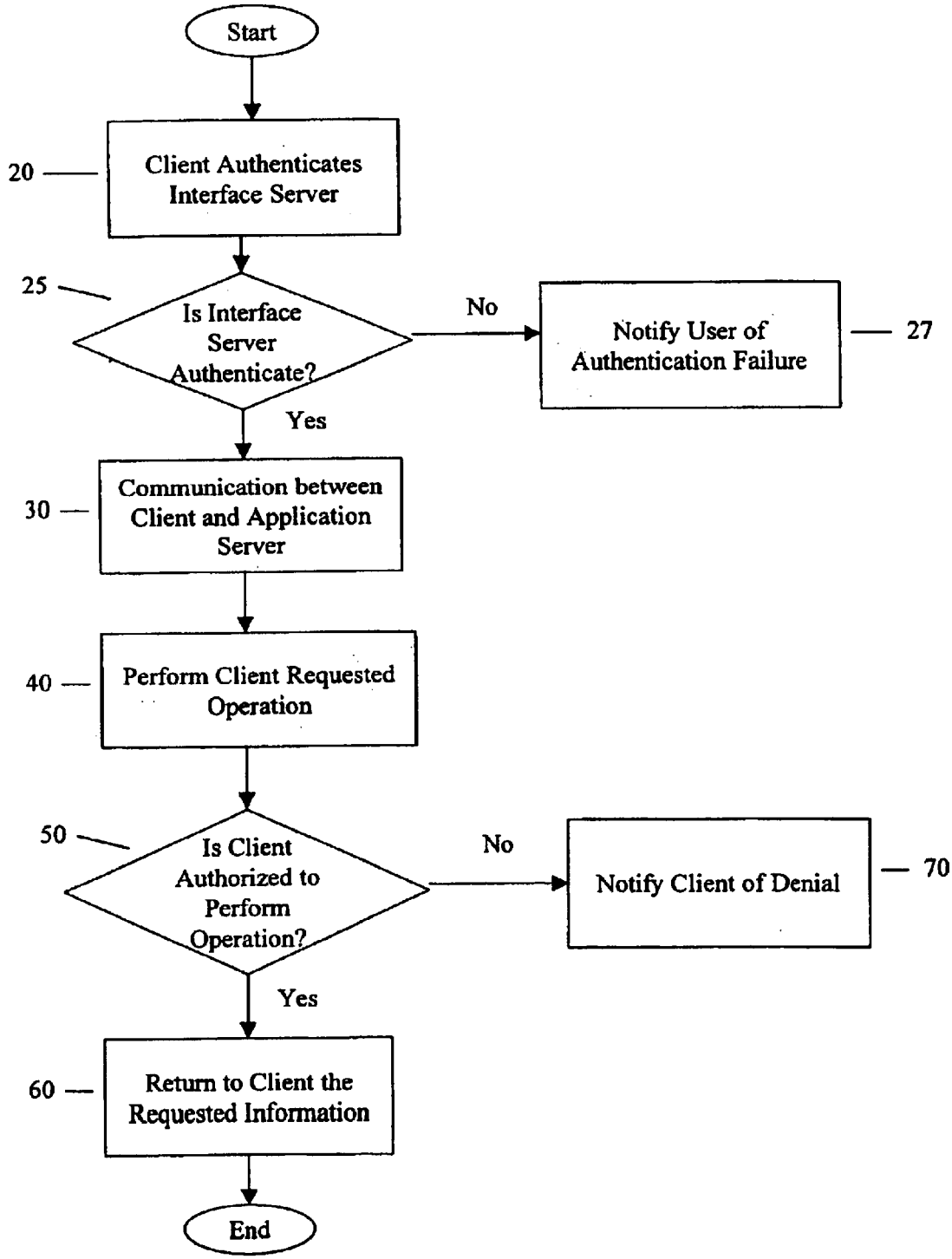
FIG. 1h shows an exemplary embodiment of a method in which a user communicates with a private network.

FIG. 1h shows exemplary steps of the method according to the present invention for allowing a client 140 to communicate with a private network 150. In step 20, the client 140 authenticates the interface server 130 by, e.g., requesting and checking the contents of a certificate. In step 25, the client 140 determines if the interface server 130 is properly authenticated. If the interface server 130 is not properly authenticated then in step 27, the client 140 notifies the user of this authentication failure. If the interface server 130 is properly authenticated, then in step 30, the client 140 transmits data to the application server 100. In step 40, the application server 100 performs the operation requested by the client 140 if the client 140 is authorized to perform that operation. If in step 50, the application server 100 determines that the client 140 is authorized to perform the operation, then in step 60, the application server 100 returns the requested information to the client 140. If, however, the application server 100 determines in step 50 that the client 140 is not authorized to perform the requested operation, then in step 70, it notifies the client 140 of the denial.

Authenticating the Interface Server

FIG. 2 represents the process for authenticating the interface server 130. In step 200, the client 140 authenticates the interface server 130 by requesting a certificate from the interface server 130. The certificate contains two parts, e.g., an encrypted part which is encrypted using the private key of the verification processor 145 and a clear text part (an unencrypted part). The certificate also contains the application server's 100 public key. In step 205, the interface server 130 sends a request for the certificate to the application server 100. In step 210, the application server 100 transmits the certificate to the client 140 and encrypts the encrypted portion of the certificate using the private key of the verification processor 145.

In step 215, the client 140 (after receiving the certificate from the application server 100) separates the certificate into two parts, i.e., the encrypted part and the clear text part. In step 220, the client 140 (using the public key of the verification processor 154 which was sent with the certificate) decrypts the encrypted part of the certificate and in step 225, determines if the decrypted part matches the clear text part. If both parts match, then in step 235, the client 140 determines that the interface server 130 is properly authenticated. However, if both parts do not match then, in step 230, the client 140 displays an error message. This process for authenticating the interface server 130 is can be implemented using, e.g., Verisign in the Microsoft Internet Explorer® or Netscape browsers.

Transmission and Storage of Data

Figure 3:
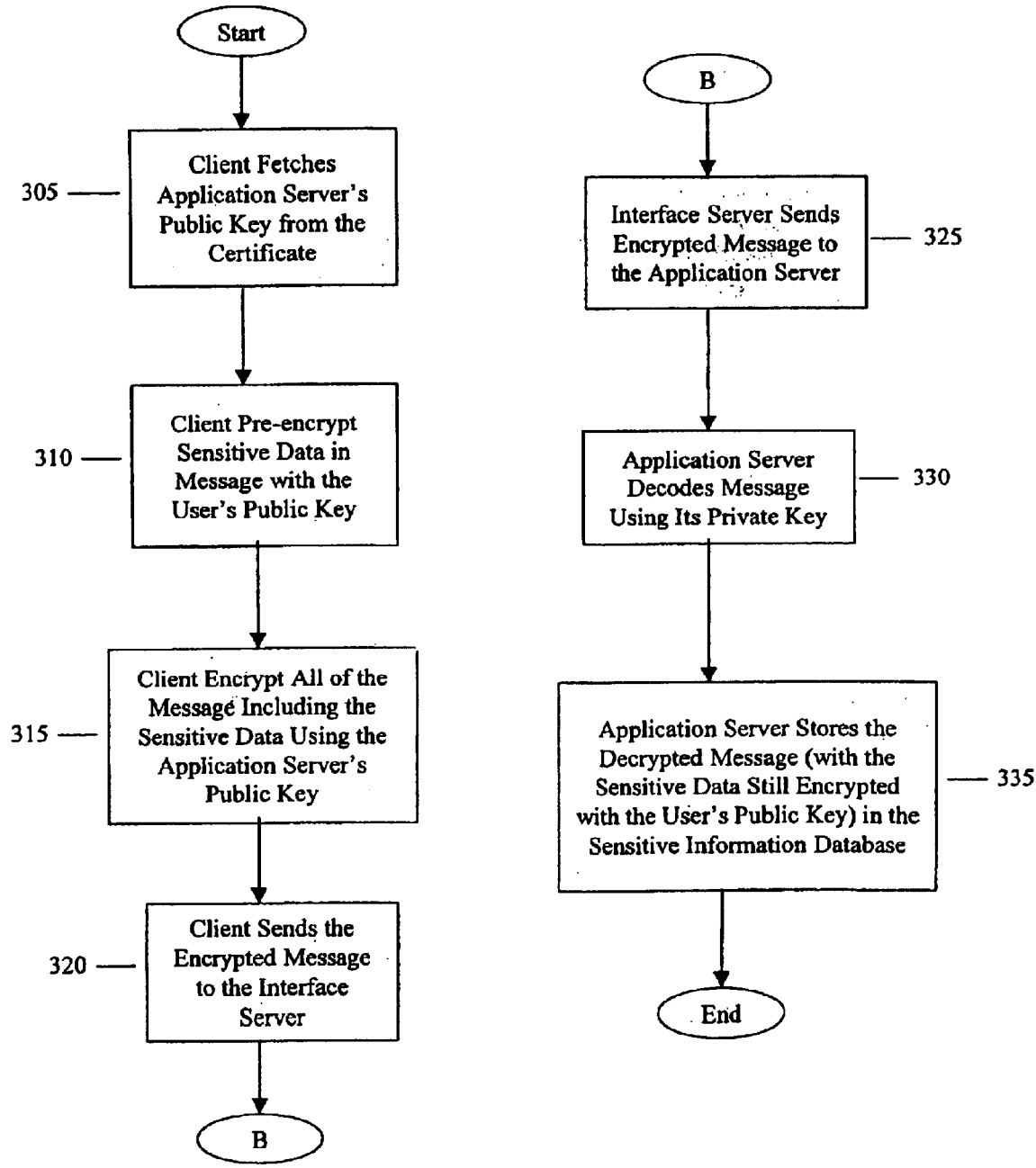
FIG. 3 shows another exemplary embodiment of a method according to the present invention for securely transmitting and storing data.

FIG. 3 shows exemplary steps of the exemplary embodiment of the present invention which may be used by the client 180 to transmit a secure request to the application server 100. In step 305, the client 140 retrieves the application server's public key 160 from the certificate. In step 310, the client 140 pre-encrypts sensitive data in the message using the user's (e.g. patient's) public key 158. In step 315, the client 140 encrypts all of the message which results in further encrypting the sensitive data with the application server's public key 160. In step 320, the client 140 transmits the encrypted message to the interface server 130. In step 325, the interface server 130 sends the encrypted message to the application server 100. In step 330, the application server 100 decodes the message using its private key 166. In step 335, the application server 100 stores the message in the record database 105. The sensitive data stored in the record database 105 remains encrypted with the user's public key 158.

The above described method is advantageous because the prior art methods do not perform this double encryption, thus leaving the sensitive information unprotected on the application server 100. (See e.g., Bruce Schneier, Applied Cryptography, Protocols, Algorithms, And Source Code In C, Pg. 28, 2d ed., John Wiley & Sons, Inc., 1996). With the above described method, the sensitive information remains encrypted, and thus protected on the application server 100. If a break-in of the private network occurs, the sensitive information remains protected because, e.g., only the user's private key 164 can decrypt that sensitive information.

The Search Operation

Figure 4:
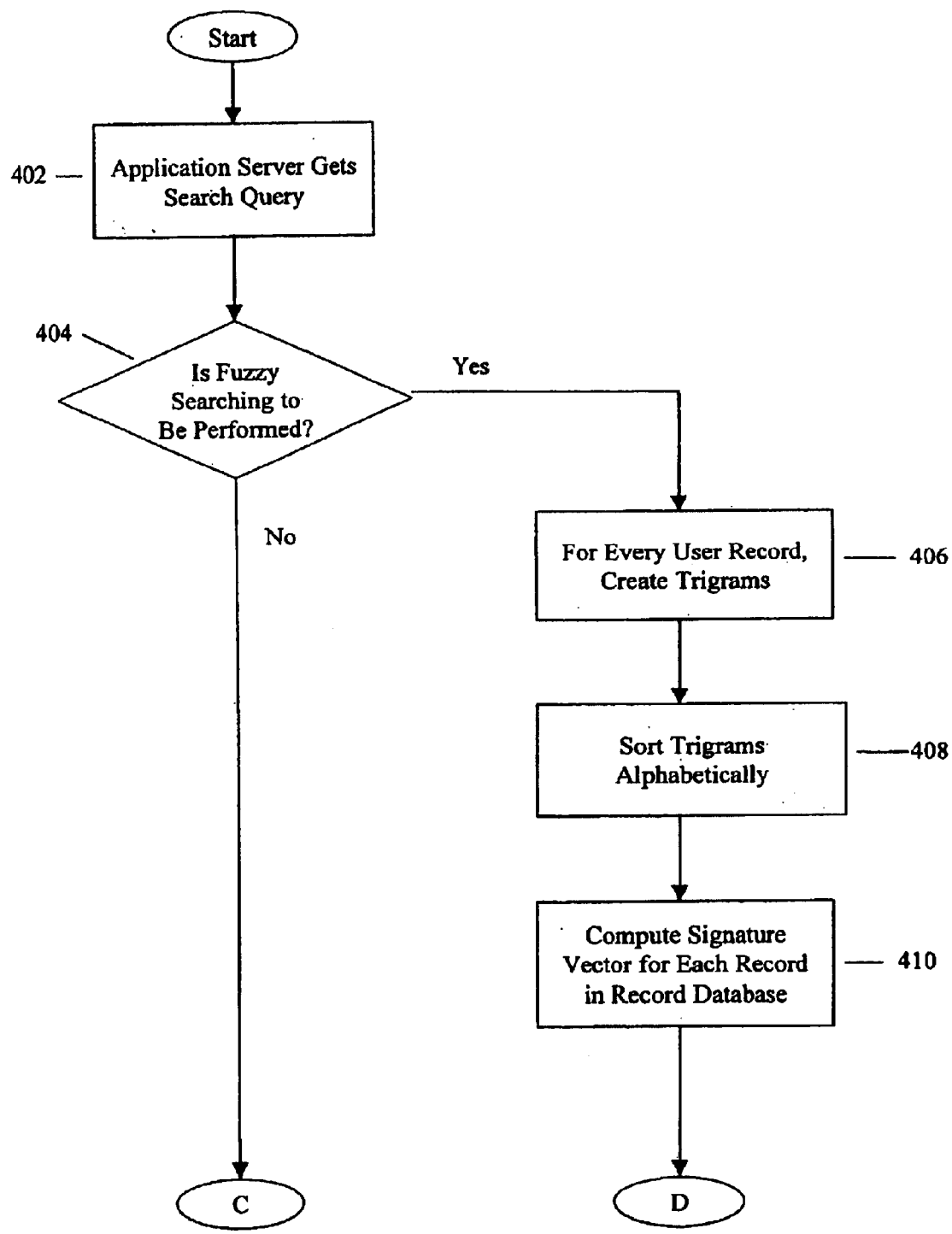
FIG. 4 shows another exemplary embodiment of a method according to the present invention for performing the searching operation.
Figure 4:
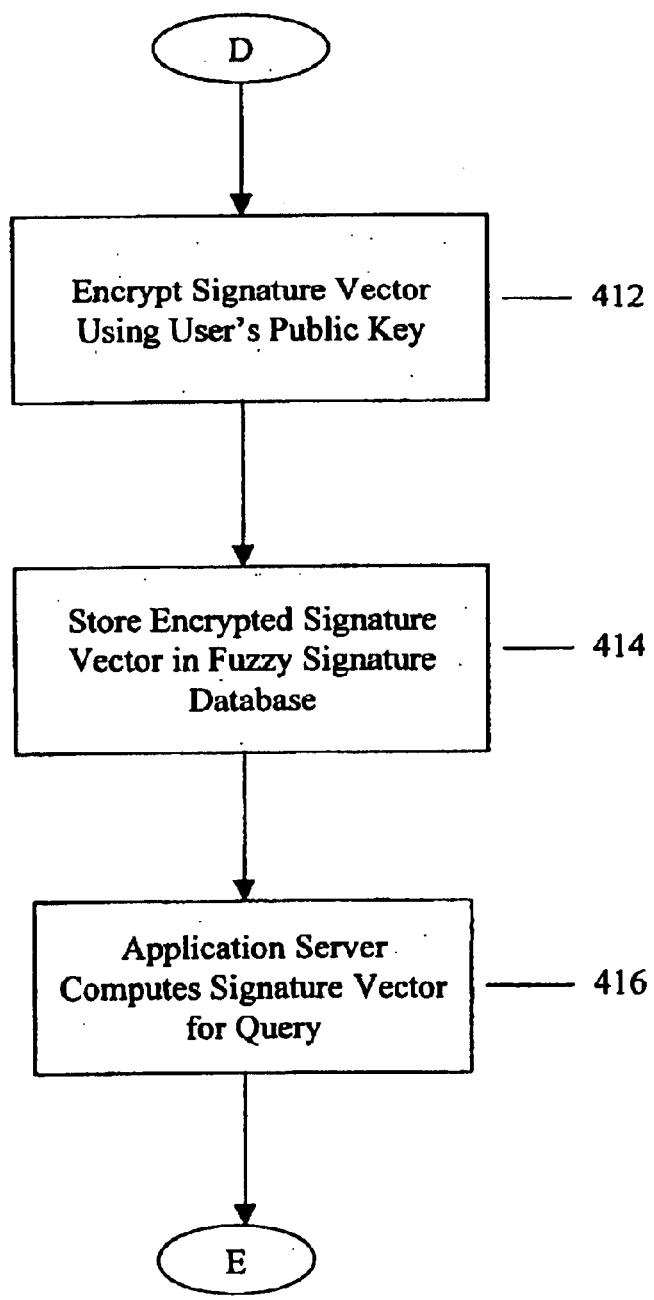
Figure 4:
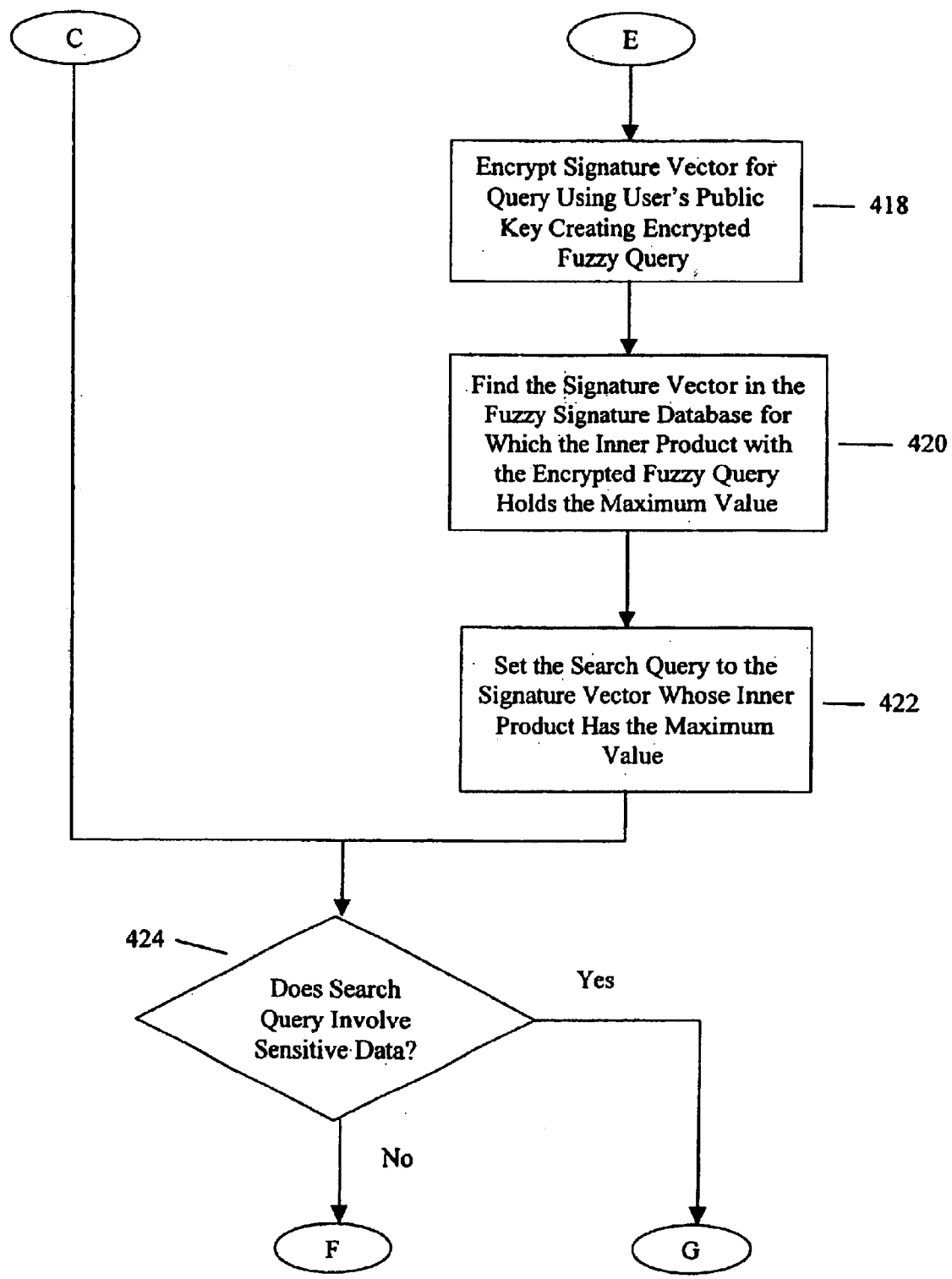
Figure 4:
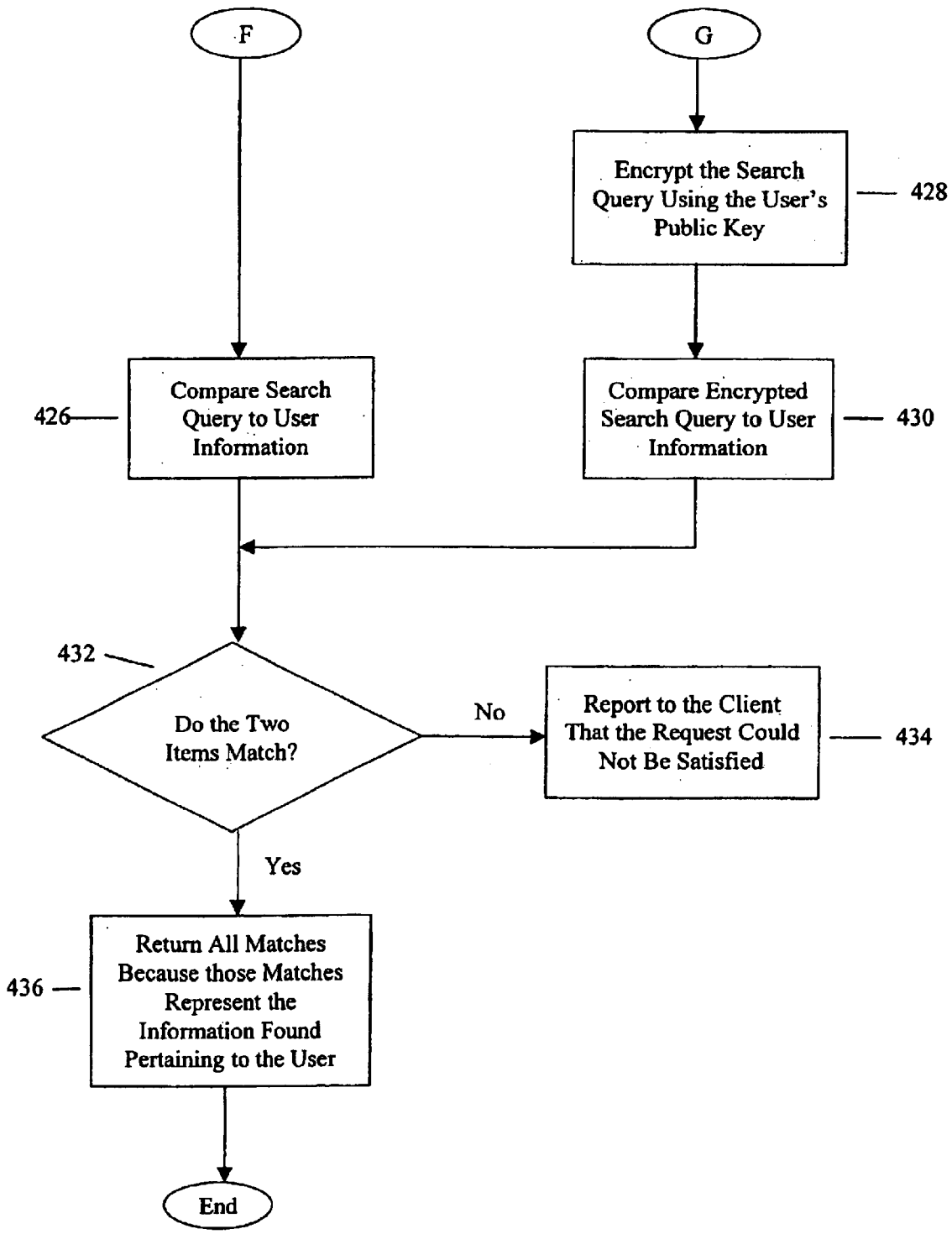

In step 40 of FIG. 1h, the application server 100 performs the operation requested by the client 140. This operation can be a search for a particular record, or an insertion or deletion of a record. For a search operation, FIG. 4 shows exemplary steps which may be used to search for a particular record. In step 402, the application server 100 obtains the search query that the client 140 previously transmitted. In step 404, the application server 100, determines if the search requires fuzzy searching. Fuzzy searching is required if the user sitting at the client 140 selects fuzzy searching rather than performing traditional searching which requires an exact match of the search query with a term in the record.

If the fuzzy searching is required, then in step 406, the application server 100 may create trigrams for every record in the record database 105. A trigram is a string of three letters. The set of all trigrams for any given portion of text characterizes that text and may be used for its identification in a limited size environment. For example, the word "cryptography" has the following trigrams: "cry", "ryp", "ypt", "pto", "tog", "ogr", "gra", "rap", "aph", and "phy". In step 408, the trigrams are sorted, e.g., alphabetically. Thus, for the above example, the trigrams would be ordered as: "aph", "cry", "gra", "ogr", "phy", "pto", "rap", "ryp", "tog", and "ypt".

In step 410, the application server 100 computes a signature vector for each record. The signature vector is a trigram frequency vector for the entire alphabet. In the previous example, the signature vector for the word "cryptography" has 0's in all positions starting with "aaa" and ending with "zzz", except for 1's in the positions of "cry", "ryp", "ypt", "pto", "tog", "ogr", "gra", "rap", "aph", and "phy". For example, the vector for cryptography would have the following values:

| aaa | aab | aac | ... | aph | ... | crp | ... | gra | ... | ogr | ... | phy |
|---|---|---|---|---|---|---|---|---|---|---|---|---|
| 0 | 0 | 0 | ... | 1 | ... | 1 | ... | 1 | ... | 1 | ... | 1 |

The signature vector can also be calculated using other methods, such as using quadgrams or pentagrams rather than trigrams.

In step 412, the application server 100 encrypts the signature vector using the user's public key 158 (i.e., the public key of the user whose information is to be retrieved from the record database 105). In step 414, the application server 100 stores the encrypted signature vector in the fuzzy signature database 120. In step 416, using, e.g., the above method employing the trigrams, the application server 100 computes the signature vector for the search query. In step 418, the application server 100 encrypts this signature vector using the user's public key 158 which results in an encrypted fuzzy query.

In step 420, the application server 100 finds the encrypted signature vector in the fuzzy signature database 120 for which the inner product with the encrypted fuzzy query holds the maximum value. The larger the inner product between the encrypted signature vector and the encrypted fuzzy query, the smaller the cosine of the angle (and thus the smaller the angle) between these two vectors. Computing the inner product is performed using the formula:

$$\sum_{i=1}^{n} x(i) \cdot y(i)$$

where x(i) and y(i) are vectors, and n is the number of dimensions of the vectors. The smaller the angle, the smaller the difference between the vectors which results in finding the signature in the fuzzy signature database that is closest to the query. The system and method according to the present invention, however is not limited to a use of the inner product to find the one vector from a group of vectors that is closest to a query vector. It is also possible to use other conventional methods for finding the one vector from a group of vectors that is closest to the query vector. In step 422, the search query is set to the signature vector whose inner product has the maximum value.

In step 424, the application server 100 determines if the search query involves sensitive data (e.g., searching on sensitive data such as the patient's name). If the search query involves sensitive data then in step 428, the application server 100 encrypts the search query using the user's public key 158 before searching in the record database 105. This encryption should be performed because the sensitive information (such as the patient's name) stored in the record database 105 is encrypted with the user's (e.g., patient's) public key 158 (refer to the section above on "Transmission and Storage of Data").

If the search query is not encrypted, then standard relational database operations such as SQL queries would not work when searching for encrypted entries in the database. For example, if a doctor was provided with all the appointments for a particular patient, it is not possible to simply execute a SELECT statement where the patient's name is equal to a certain value because the patient's name (which is sensitive data) is encrypted in the database. Moreover, because the patient's name is encrypted with the patient's public key, it can only be decrypted using the patient's private key. By encrypting the search query, sensitive information can remain encrypted in the database and standard SQL search capabilities can be performed using the encrypted search query. In addition, the patient's private key is not required to perform a search, and therefore sensitive information is not compromised.

In step 430, the application server 100 compares the encrypted search query to the sensitive patient information in the record database 105. If the search query does not involve sensitive data, then in step 426, the application server 100 compares the search query with the user information stored in the record database 105.

In step 432, the application server 100 determines if the two particular items match. This determination can be made by, for example, comparing the search query or the encrypted search query with the relevant field of a record in the record database 105. If the search query requests all patients with the name "John Doe", then the application server 100 searches for all records in the record database 105 whose name field contains the name "John Doe". If the items match, then in step 436, all the records that match the search query are returned. If the items do not match, then in step 434, the application server 100 reports to the client 140 that its request could not be satisfied.

After searching and finding the desired information, if that found information contains the sensitive information then that information needs to decrypted using the procedure described below.

Checking Client Authorization

Figure 5:
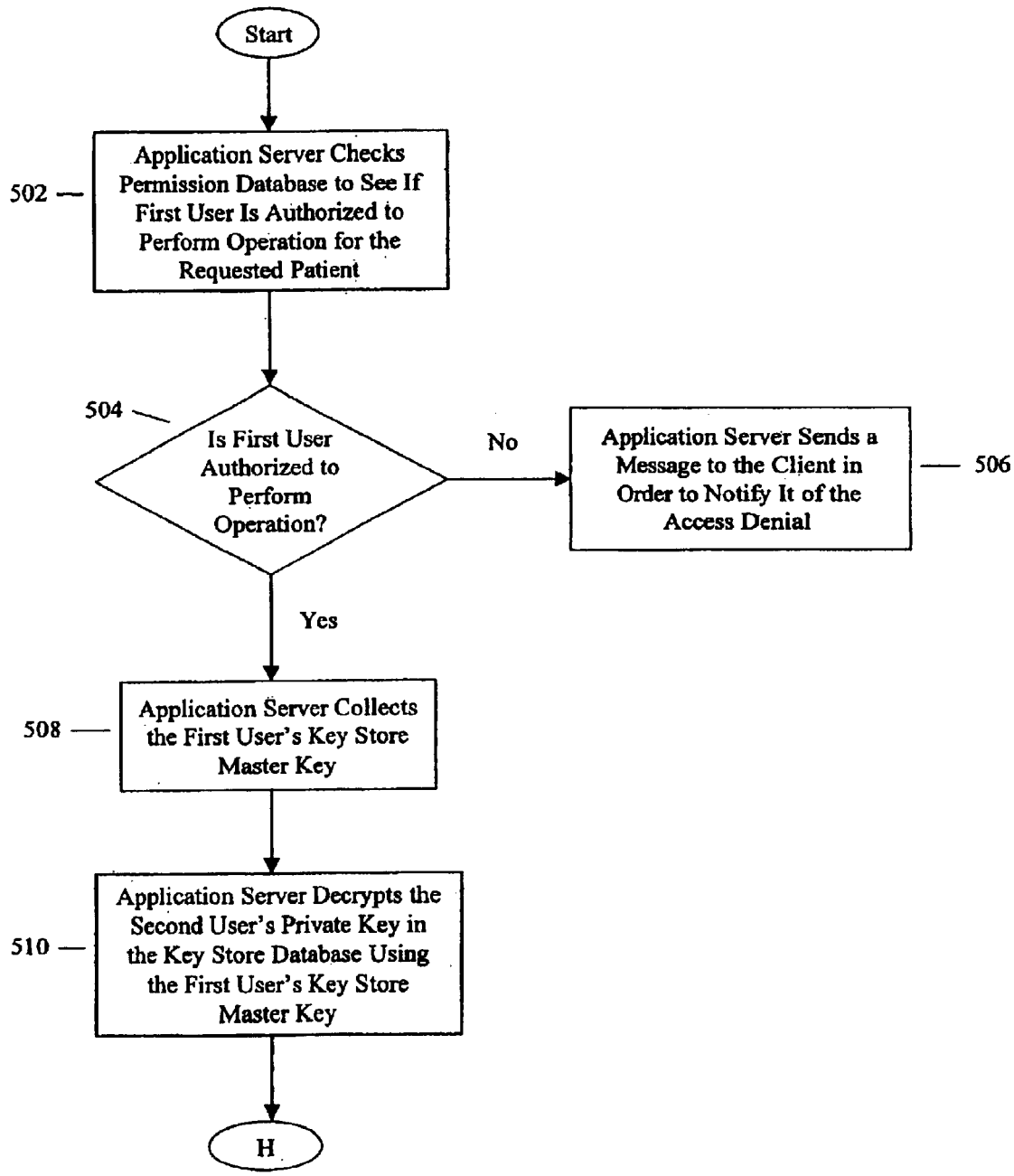
FIG. 5 shows another exemplary embodiment of a method according to the present invention for accessing sensitive data.
Figure 5:
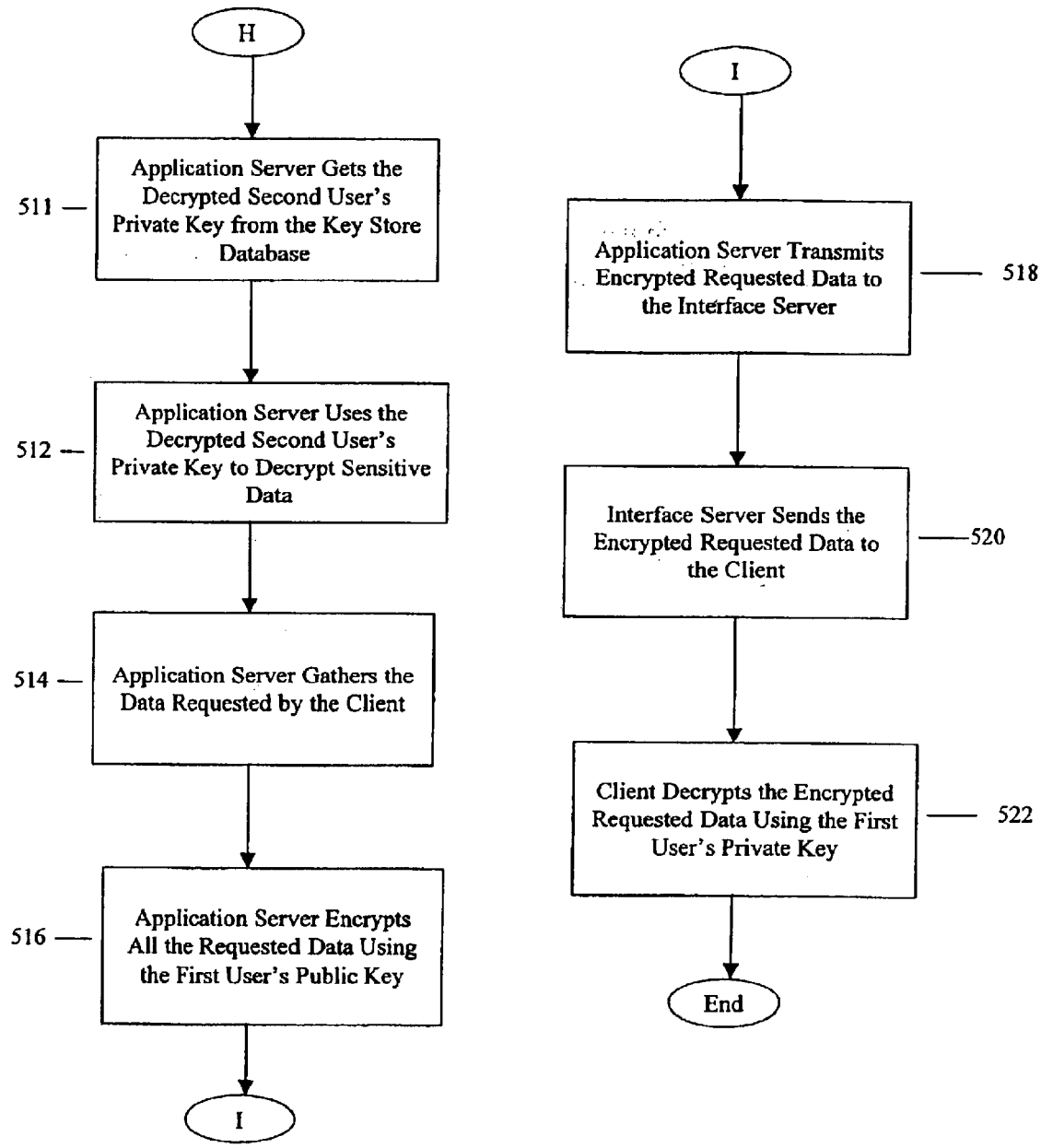

FIG. 5 shows exemplary steps of the exemplary embodiment of the system and method according to the present invention for authorizing the client's request when sensitive information is involved. Such sensitive information resides in the record database 105 and is encrypted with the user's (e.g. patient's) public key 158. To decrypt that sensitive information and thus be able to use it, the doctor, patient, or another user must be authorized to access that information. If authorized, the application server 100 sends the requested information back to the client 140. In this embodiment, a first user (e.g., a doctor) is allowed to access sensitive information of second user (e.g., a patient) using only three encryption keys.

In step 502, the application server 100 determines if a first user is authorized to perform the requested operation by checking the permission database 125. The permission database 125 contains information as to which users (such as doctors and patients) are allowed to perform operations (e.g., view, search, add, delete, etc.) on the sensitive information located in the records of the record database 105 (e.g., doctor research records or patient records). See Table 1 above for the list of access privileges that doctors and patients can give with regards to patient records and doctor research records.

If the first user is not authorized to perform the requested operation on the sensitive information, then in step 506, the application server 100 sends a message to the client 140 to notify it of the access denial. If the first user is authorized to perform the requested operation on the sensitive information, then in step 508, the application server 100 collects the first user's key-store master key 168 which that first user provides. In step 510, the application server 100, using the first user's key-store master key 168, decrypts a second user's private key 164. While in the key-store database 115, the second user's private key 164 is encrypted with the key-store master key. In step 511, the application server 100 obtains the second user's private key from the key-store database 115. In step 512, the application server 100 uses the second user's private key to decrypt the sensitive data found in the second user's record in the record database 105.

The above process of using the key-store master key 168 and the key-store database 115 provided an improvement in that n−1 keys for n people are no longer required. (See e.g., Bruce Schneier, Applied Cryptography, Protocols, Algorithms, And Source Code In C, 2 ed., John Wiley & Sons, Inc., 1996).

By using the key-store master key 168 and the key-store database 115, only three keys (e.g., the doctor's or first user's public key 158, the key-store master key 168, and the patient's or second user's private key 164) are all that may be necessary to give a doctor access to a patient's records.

The key-store database 115 keeps track of the public and private keys of the users. It enables an authorized user to use another user's private key to decrypt a particular piece of the sensitive data. Usage of the key-store database 115 separates the data from the keys. To prevent an intruder of the application server 100 from gaining access to the users' sensitive data via the patients' private keys stored in the key-store database 115, all keys stored in the key-store database 115 are encrypted using the key-store master key 168.

Returning Information to the Client

The application server 100 may send the client requested information, including the sensitive information, back to the client 140. In step 514, the application server 100 gathers the data requested by the client 140. In step 516, the application server 100 encrypts the requested data using the first user's public key 158. In step 518, the application server 100 transmits encrypted requested data to the interface server 130. In step 520, the interface server 130 sends the encrypted requested data to the client 140. In step 522, the client 140 decrypts the encrypted requested data using the first user's private key. The decrypted sensitive information of the second user is now readable by the first user.

The system and method of the present invention is not limited to the medical industry and in particular where a physician or patient tries to access records of another physician or patient. The system and method may also be applicable in other asymmetric privilege granting environments. For example, the system and method may be used in a corporate environment where an employer has access to employee's records but the employee might have access to only his or her own record, or have access to other employee's records depending on that employee's position in the company (such as a manager of other employees). The company may have various offices such that a public network would need to be used in order to access certain information from a private network. In this situation, the system and method again capitalizes on the asymmetry of the privilege granting scheme to minimize the number of keys used by the participating users.

Another example is the banking environment where a customer's own bank statement is accessible to that customer but is not accessible to other customers. It is also accessible to certain bank employees such as the loan department or the payment departments. Because of the asymmetry of the privilege granting scheme, this environment can also capitalize on the asymmetry to minimize the number of keys used by the participating users (e.g., bank customers, bank employees, etc.).

While the present invention is described in conjunction with the preferred embodiments, it will be understood that they are not intended to limit the invention to that embodiment. On the contrary, this invention is intended to cover alternatives, modifications, and equivalents, which may be included within the spirit and scope of the invention as defined by the claims. Furthermore, in the previous detailed description of the present invention, numerous specific details are set forth in order to provide a thorough understanding of the present invention. However, it will be obvious to one of ordinary skill in the art that the present invention may be practiced without these specific details. In addition, several definitions are provided but it will be appreciated that these definitions are not meant to be limiting but are rather provided for context purposes and that among others, the general definition, as understood by those skilled in the art, also applies. In other instances, well known methods, procedures, components, and circuits have not been described in detail as not to unnecessarily obscure aspects of the present invention.

What is claimed is:

1. A system for securely transmitting and storing data comprising:

a client arrangement which encrypts sensitive data using a first key to generate pre-encrypted sensitive data, the client encrypting non-sensitive data and the pre-encrypted sensitive data using a second key; and a private network arrangement including:

a record database including a set of records, a key-store database including a set of third keys which are encrypted using a fourth key, a fuzzy signature database including signature vectors which are encrypted using the first key, a permission database including authorization information, and an application server locating one of the signature vectors in the fuzzy signature database which substantially corresponds to a query request, performing at least one relational database operation on an encrypted query request, and determining if a first user is authorized to perform an operation, using the authorization information, wherein, if the first user is authorized, the application server obtains the fourth key for decrypting a particular key of the third keys which corresponds to particular information for a second user stored in the key-store database, and wherein the application server decrypts the sensitive data obtained from the record database using the particular key.

2. The system of claim 1, further comprising:

a communication network arrangement connecting the private network arrangement to the client arrangement.

3. The system of claim 2, wherein the communication network arrangement is a public network arrangement.

4. The system of claim 3, further comprising:

an interface server connecting the public network arrangement to the private network arrangement.

5. The system of claim 4, further comprising:

a verification processor authenticating the interface server.

6. The system of claim 1, wherein the records include non-privileged user records and privileged user records.

7. The system of claim 1, wherein the first key is a public key of the first user.

8. The system of claim 1, wherein the second key is a public key of the application server.

9. The system of claim 1, wherein the third keys include private keys, each key corresponding to a separate user.

10. The system of claim 1, wherein the fourth key is a key-store master key which is utilized for accessing the key-store database.

* * * * *